United States Patent
Yabe et al.

(10) Patent No.: US 9,528,244 B2
(45) Date of Patent: Dec. 27, 2016

(54) WORK VEHICLE

(71) Applicant: KOMATSU LTD., Tokyo (JP)

(72) Inventors: Mitsuo Yabe, Hiratsuka (JP); Akihiro Ohsawa, Kanagawa (JP); Toshiya Shintani, Chigasaki (JP); Teruyuki Matsuki, Hadano (JP); Yoshiaki Yoshida, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 164 days.

(21) Appl. No.: 14/400,013

(22) PCT Filed: Aug. 19, 2014

(86) PCT No.: PCT/JP2014/071637
§ 371 (c)(1),
(2) Date: Nov. 10, 2014

(87) PCT Pub. No.: WO2016/027307
PCT Pub. Date: Feb. 25, 2016

(65) Prior Publication Data
US 2016/0153173 A1 Jun. 2, 2016

(51) Int. Cl.
*E02F 9/08* (2006.01)
*B60K 11/04* (2006.01)
(Continued)

(52) U.S. Cl.
CPC ............. *E02F 9/0866* (2013.01); *B60K 11/04* (2013.01); *B60K 13/04* (2013.01); *E02F 3/283* (2013.01);
(Continued)

(58) Field of Classification Search
CPC ....... E02F 9/0866; E02F 9/0883; B60K 11/04; B60K 11/06; F01N 3/2066; F01N 13/08
See application file for complete search history.

(56) References Cited

U.S. PATENT DOCUMENTS 4,606,422 A * 8/1986 Jewett ................... B60K 11/08
180/68.1
5,839,397 A * 11/1998 Funabashi .............. B60K 11/04
123/41.01
(Continued)

FOREIGN PATENT DOCUMENTS

CN 103429827 A 12/2013
JP 53-152341 U 5/1977
(Continued)

OTHER PUBLICATIONS

The International Search Report for the corresponding international application No. PCT/JP2014/071637, issued on Oct. 28, 2014.
(Continued)

*Primary Examiner* — John Walters
*Assistant Examiner* — Brian Swenson
(74) *Attorney, Agent, or Firm* — Global IP Counselors, LLP

(57) ABSTRACT

A wheel loader is provided with an engine, an engine compartment, a top plate, an injection device, and a duct member. The engine compartment houses the engine. The top plate has a first opening section. The top plate defines the upper surface of the engine compartment. The injection device is disposed inside the engine compartment. The duct member is disposed above the injection device. The duct member is disposed below the first opening section.

20 Claims, 6 Drawing Sheets

(51) Int. Cl.

| | |
|---|---|
| *B60K 13/04* | (2006.01) |
| *E02F 9/00* | (2006.01) |
| *F01N 3/28* | (2006.01) |
| *E02F 3/28* | (2006.01) |
| *F01N 3/20* | (2006.01) |
| *F01N 13/08* | (2010.01) |

(52) U.S. Cl.
CPC .............. *E02F 9/00* (2013.01); *E02F 9/0883* (2013.01); *F01N 3/2046* (2013.01); *F01N 3/2066* (2013.01); *F01N 3/28* (2013.01); *F01N 13/08* (2013.01)

(56) References Cited

U.S. PATENT DOCUMENTS

| | | | |
|---|---|---|---|
| 6,192,839 B1 * | 2/2001 | Takeshita | E02F 9/0866 123/41.49 |
| 6,302,066 B1 * | 10/2001 | Steinmann | B60K 11/02 123/41.49 |
| 6,390,770 B1 * | 5/2002 | Takeshita | E02F 9/0866 415/119 |
| 6,655,486 B2 * | 12/2003 | Oshikawa | B60K 11/08 180/68.1 |
| 8,230,957 B2 * | 7/2012 | Braun | B60K 11/00 123/41.49 |
| 2002/0104491 A1 * | 8/2002 | Izumi | E02F 9/00 123/41.49 |
| 2007/0007061 A1 * | 1/2007 | Meyer | B60K 11/04 180/68.1 |
| 2012/0048631 A1 * | 3/2012 | Shatters | B60K 11/00 180/68.1 |
| 2014/0238767 A1 | 8/2014 | Numa | |
| 2014/0374186 A1 | 12/2014 | Nagami et al. | |
| 2015/0017901 A1 * | 1/2015 | Pfohl | F01P 5/043 454/141 |

FOREIGN PATENT DOCUMENTS

| | | |
|---|---|---|
| JP | 8-48160 A | 2/1996 |
| JP | 10-338036 A | 12/1998 |
| JP | 11-343636 A | 12/1999 |
| JP | 2007-283801 A | 11/2007 |
| JP | 2012-184602 A | 9/2012 |
| JP | 2013-112283 A | 6/2013 |
| JP | 5329009 B1 | 10/2013 |
| JP | 2014-25254 A | 2/2014 |
| WO | 2013/175981 A1 | 11/2013 |

OTHER PUBLICATIONS

The Office Action for the corresponding Chinese application No. 201480001071.1 dated Jun. 24, 2016.

* cited by examiner

WORK VEHICLE

CROSS-REFERENCE TO RELATED APPLICATIONS

This application is a U.S. National stage application of International Application No. PCT/JP2014/071637, filed on Aug. 19, 2014.

BACKGROUND

Field of the Invention

The present invention relates to a work vehicle.

A work vehicle is provided with an engine compartment. An engine is contained inside the engine compartment. Various devices other than the engine are also contained inside the engine compartment. For example, an exhaust gas post-processing device for processing exhaust gas from the engine is contained inside the engine compartment in the work vehicle disclosed in Japanese Patent Laid-open No. 2014-025254.

SUMMARY

When the engine or the various devices contained inside the engine compartment generate heat during operation, the temperature inside the engine compartment rises. As a result, members disposed inside the engine compartment are exposed to hot air inside the engine compartment. When members which are preferably prevented from becoming hotter are disposed inside the engine compartment, such members are preferably suppressed in exposure to the hot air inside the engine compartment.

An object of the present invention is to suppress the exposure to hot air for a member to be cooled disposed inside the engine compartment.

Solution to Problem

A work vehicle according to an aspect of the present invention is provided with an engine, an engine compartment, a top plate, a member to be cooled, and a duct member. The engine compartment contains the engine. The top plate has a first opening section. The top plate defines the upper surface of the engine compartment. The member to be cooled is disposed inside the engine compartment. The duct member is disposed above the member to be cooled. The duct member is disposed below the first opening section.

According to this configuration, hot air in the vicinity of the member to be cooled can be sent upwards via the duct member due to a chimney effect because the duct member is disposed above the member to be cooled. The hot air sent upwards via the duct member is exhausted to the outside of the engine compartment via the first opening section in the top plate. As a result, the exposure to hot air for member to be cooled disposed inside the engine compartment can be suppressed. The first opening section, the duct member, and the member to be cooled are preferably located overlapping each other as seen in a plan view.

The work vehicle is preferably further equipped with a first cover member. The first cover member is disposed above the first opening section to cover the first opening section. According to this configuration, the intrusion of rainwater into the engine compartment through the first opening section can be prevented by the first cover member.

The first cover member preferably has a cover body section, and a first folded section. The cover body section covers the first opening section. The first folded section extends downward from the outer edge part of the cover body section. According to this configuration, the trickling of rainwater attached to the upper surface of the first cover member to the lower surface can be prevented by the first folded section.

The work vehicle is preferably further equipped with a second cover member. The second cover member has a first ventilation section configured by a plurality of through-holes. The second cover member is disposed above the first cover member.

According to this configuration, the intrusion of foreign matter into the engine compartment can be prevented by the second cover member. That is, the first ventilation section in the second cover member is formed with a plurality of through-holes. As a result, foreign matter can be prevented from entering into the engine compartment via the first ventilation section by appropriately setting the size of the through-holes.

The second cover member preferably has an upper plate part and a side plate part. The upper plate part is disposed above the first cover member. The side plate part extends downward from the outer edge part of the upper plate part. The upper plate part has the first ventilation section.

The second cover member preferably further has a second ventilation section. The second ventilation section is configured by a plurality of through-holes formed in the side plate part. According to this configuration, hot air can be exhausted to the outside of the engine compartment via the second ventilation section in addition to the first ventilation section. Moreover, rainwater that intrudes to the inside of the second cover member can be discharged to the outside of the second cover member via the second ventilation section.

The top plate preferably has a top plate body section and a second folded section. The second folded section extends upwards from the top plate body section surrounding the first opening section. The lower end of the second ventilation section is positioned lower than the upper end of the second folded section.

According to this configuration, rainwater that intrudes into the second cover member, trickles on the top plate body section, and then intrudes into the engine compartment from the first opening section can be blocked by the second folded section. Moreover, since the lower end of the second ventilation section is positioned lower than the upper end of the second folded section, rainwater that intrudes into the second cover member is discharged to the outside of the second cover member via the second ventilation section before crossing the second folded section.

The second cover member preferably is attached to the top plate. The first cover member is attached to the second cover member.

The top plate preferably has a top plate body section and a second folded section. The second folded section extends upwards from the top plate body section to surround the first opening section. According to this configuration, the intrusion of rainwater attached to the top plate body section into the engine compartment via the first opening section can be blocked by the second folded section.

The top plate preferably further has a second opening section disposed in the proximity of the first opening section. According to this configuration, hot air inside the engine compartment can also be exhausted from the second opening section.

The work vehicle is preferably further provided with a selective catalyst reduction device and a connecting pipe. The selective catalyst reduction device is configured to treat exhaust gas from the engine. The connecting pipe is connected to the selective catalyst reduction device. The member to be cooled is an injection device configured to inject a reducing agent into the connecting pipe.

The lower end section of the duct member preferably has a flow passage area that is larger than that of the upper end section of the duct member.

The flow passage area of the upper end section and the flow passage area of the lower end section of the duct member may be substantially the same.

The upper end section of the duct member is preferably attached to the top plate.

The duct member is preferably coated or plated with a coating having a lower emissivity than the duct member.

The duct member preferably is formed with aluminum or an aluminum alloy.

The duct member has a heat-shielding section disposed between the member to be cooled and a heat source. According to this configuration, radiant heat radiating from the heat source toward the member to be cooled can be blocked by the heat-shielding section.

The work vehicle preferably is further provided with a cooling compartment, a partition wall, a cooling fan, and a communication section. The partition wall separates the cooling compartment and the engine compartment. The cooling fan exhausts air from the cooling compartment. The communication section allows communication between the engine compartment and the cooling compartment.

According to this configuration, negative pressure is developed on the air intake side of the cooling fan due to the action of the cooling fan. As a result, the communication section sucks in air inside the engine compartment and exhausts the air that is sucked in toward the cooling compartment. Further, outside air flows from the outside into the engine compartment via the first opening section in the top plate. Because the duct member guides outside air from the first opening section to the member to be cooled, the member to be cooled can be cooled efficiently.

The communication section preferably is a communication hole formed in the partition wall.

According to the present invention, the exposure of hot air on a member to be cooled disposed inside the engine compartment can be suppressed.

DESCRIPTION OF EXEMPLARY EMBODIMENTS

Figure 1:
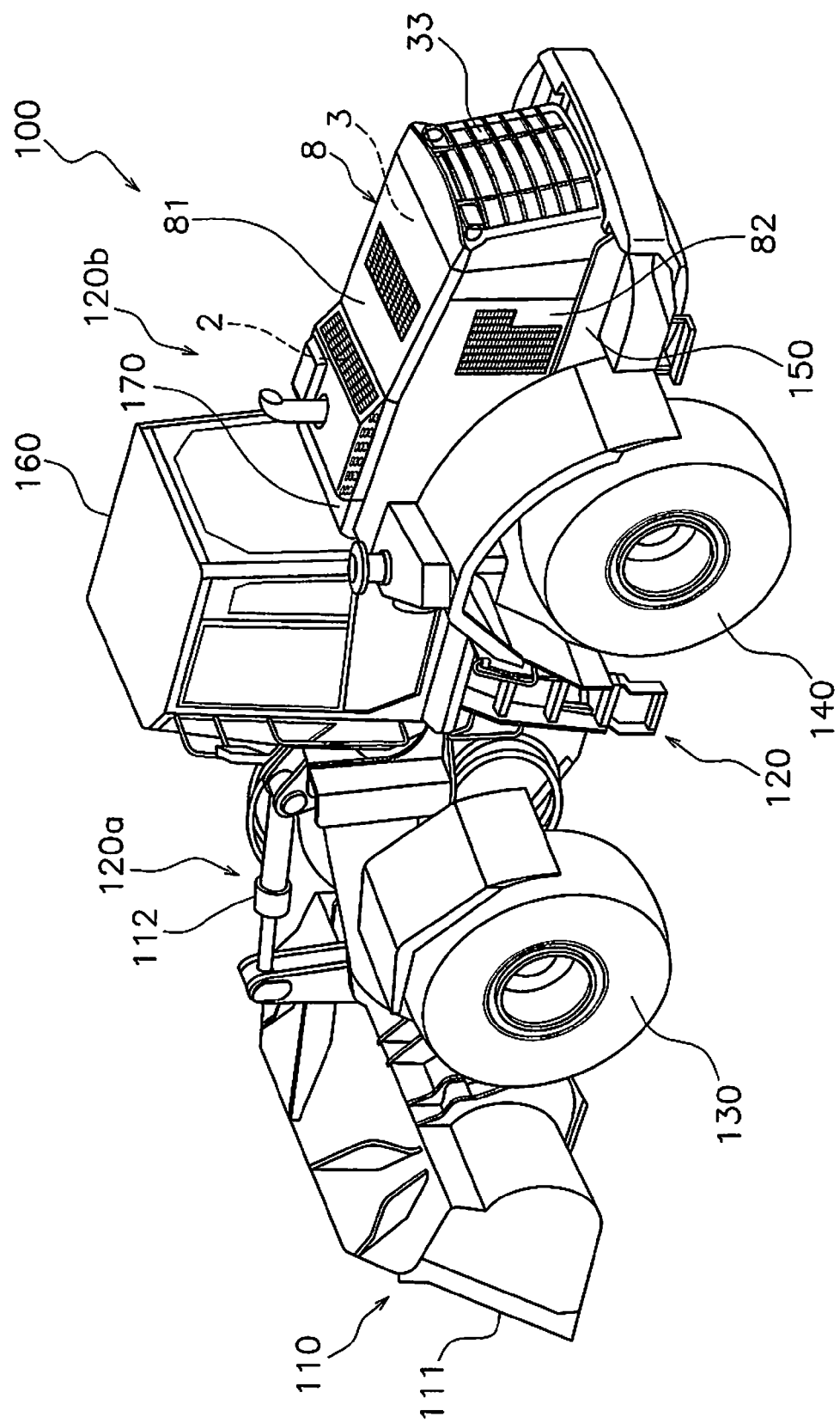
FIG. 1 is a perspective view of a wheel loader.

An exemplary embodiment of a wheel loader as an example of a work vehicle according to the present invention will be explained below with reference to the drawings. FIG. 1 is a perspective external view of a wheel loader 100 as seen from the left rear. In the following description, "right," "left," "up," and "down" indicate directions relative to a state of looking forward from the driver's seat. "Vehicle width direction" and "left-right direction" have the same meaning. Moreover, the front-back direction signifies the front-back direction of the vehicle body.

As illustrated in FIG. 1, the wheel loader 100 includes a work implement 110, a vehicle body 120, front wheels 130, and rear wheels 140. The wheel loader 100 is capable of traveling due to the rotation of the front wheels 130 and the rear wheels 140, and desired work can be conducted using the work implement 110.

The work equipment 110 is a mechanism driven by operating fluid pressurized by a hydraulic pump, and is disposed at the front of the vehicle body 120. The work equipment 110 includes a bucket 111, a boom (not shown), a lift cylinder (not shown), and a bucket cylinder 112. The bucket 111 is attached to the tip of the boom. The boom is a member for lifting the bucket 111. The boom is mounted at the front part of a belowmentioned front vehicle section 120a. The lift cylinder drives the boom with pressure oil discharged from a work implement pump. The bucket cylinder 112 drives the bucket 111 with pressure oil discharged from the work implement pump.

The vehicle body 120 has the front vehicle section 120a and a rear vehicle section 120b. The front vehicle section 120a and the rear vehicle section 120b are connected to each other to allow swinging in the left-right direction. The work implement 110 and the front wheels 130 are provided on the front vehicle section 120a. The rear wheels 140 are provided on the rear vehicle section 120b.

The rear vehicle section 120b has a vehicle frame 150, a cab 160, an engine compartment 2, and a cooling compartment 3. The vehicle frame 150 is a frame that configures the rear vehicle section 120b. The vehicle frame 150 supports the rear wheels 140, the cab 160, a hydraulic fluid tank 170, and the engine 11 (see FIG. 2).

An operating cabin is provided inside the cab 160, and various operating members and an operating panel are provided inside the cab 160. The hydraulic fluid tank 170 is disposed to the rear of the cab 160. A plurality of hydraulic pumps (not shown) are disposed below the operating fluid tank 170. Operating fluid for driving the work implement 110 and the like is accumulated in the operating fluid tank 170, and the operating fluid is supplied to the work implement 110 and the like by the hydraulic pumps.

Figure 2:
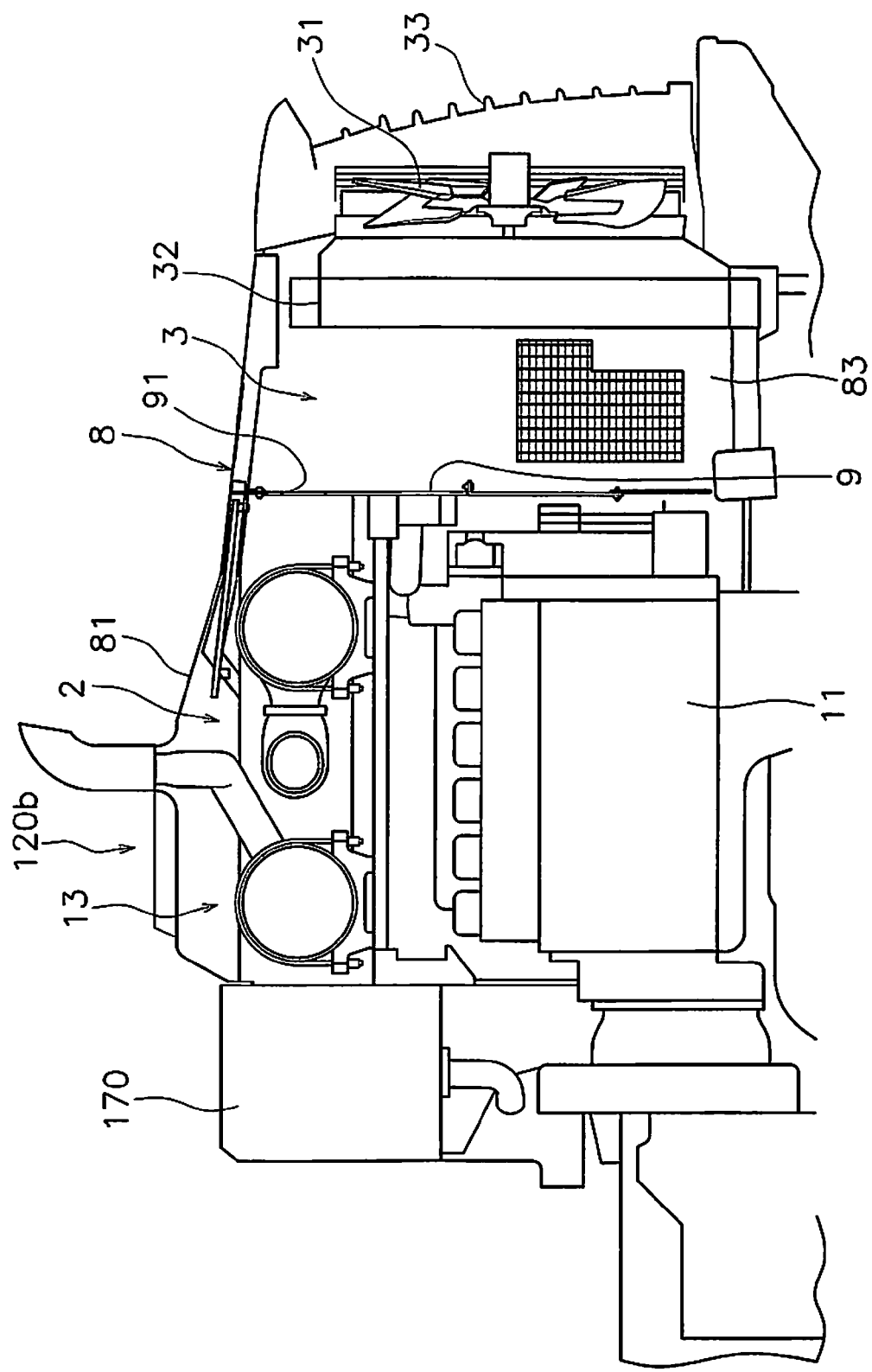
FIG. 2 is a side cross-sectional view of a rear vehicle section.

FIG. 2 is a side cross-sectional view of the rear vehicle frame 120b as seen from the left. As illustrated in FIG. 2, the engine compartment 2 is disposed to the rear of the cab 160 and is defined by a vehicle body cover 8.

As illustrated in FIG. 1, the vehicle body cover 8 has a top plate 81, a first side plate 82, and a second side plate 83 (see FIG. 2). The top plate 81 defines the upper surface of the engine compartment 2. The first and second side plates 82 and 83 define the side surfaces of the engine compartment 2. Specifically, the first side plate 82 defines the left side surface of the engine compartment 2, and the second side plate 83 defines the right side surface of the engine compartment 2.

As illustrated in FIG. 2, the engine 11 and an exhaust gas post-processing device 13 and the like are contained inside the engine compartment 2. The engine 11 is disposed in a lower part of the engine compartment 2 and is an engine in which the crankshaft extends in the front-back direction, that is, a so-called vertical mounted engine.

Figure 3:
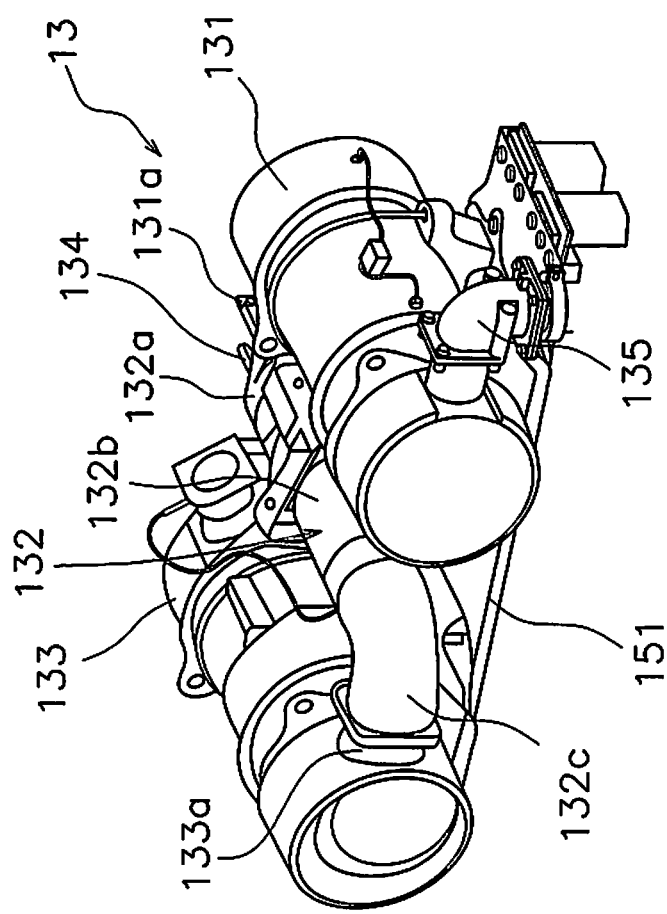
FIG. 3 is a perspective view of an exhaust gas post-processing device.

The exhaust gas post-processing device 13 is disposed in an upper part of the engine compartment 2. Specifically, the exhaust gas post-processing device 13 is disposed above the engine 11. FIG. 3 is a perspective view of the exhaust gas post-processing device 13 as seen from the left rear.

As illustrated in FIG. 3, the exhaust gas post-processing device 13 includes, in order of the flow of exhaust gas, a diesel particulate filtering device 131, a connecting pipe 132, and a selective catalyst reduction device 133. An injection device 134 is attached to the connecting pipe 132. The injection device 134 corresponds to the member to be cooled of the exemplary embodiments of the present invention.

The diesel particulate filtering device 131 is connected to the engine 11 through a pipe 135. The diesel particulate filtering device 131 is a device for treating exhaust gas exhausted from the engine 11.

Specifically, the diesel particulate filtering device 131 is a device that collects, in a filter, particulate matter, such as soot, in the exhaust gas exhausted from the engine 11. The diesel particulate filtering device 131 uses a catalyst to increase the temperature of the exhaust gas to cause combustion of the collected particulate matter. The diesel particulate filtering device 131 is supported by a supporting member 151 attached to the vehicle frame 150.

The connecting pipe 132 is connected to the selective catalyst reduction device 133. Specifically, the connecting pipe 132 connects the diesel particulate filtering device 131 and the selective catalyst reduction device 133.

The entire connecting pipe 132 is formed in an S shape and includes a first bend section 132*a*, a linear section 132*b*, and a second bend section 132*c*. The first bend section 132*a* is connected to an exhaust gas lead-out port 131*a* of the diesel particulate filtering device 131. The second bend section 132*c* is connected to an exhaust gas inlet port 133*a* of the selective catalyst reduction device 133. The linear section 132*b* extends between the first bend section 132*a* and the second bend section 132*c*.

The injection device 134 is attached to the first bend section 132*a*. The injection device 134 injects a urea water aqueous solution into the connecting pipe 132. The urea water aqueous solution is sucked up from a urea water aqueous solution tank (not shown) by a pump (not shown) and is supplied to the injection device 134 via a pipe (not shown). The urea water aqueous solution injected into the connecting pipe 132 undergoes hydrolysis due to the heat from the exhaust gas and becomes ammonia. The ammonia is fed with the exhaust gas through the connecting pipe 132 to the selective catalyst reduction device 133.

The abovementioned ammonia is used as a reducing agent to purify by reduction the nitrogen oxides in the exhaust gas in the selective catalyst reduction device 133. The selective catalyst reduction device 133 is supported by the supporting member 151 in the same way as the diesel particulate filtering device 131.

The diesel particulate filtering device 131 and the selective catalyst reduction device 133 are disposed parallel to each other. Specifically, the diesel particulate filtering device 131 and the selective catalyst reduction device 133 both have substantially cylindrical shapes. The center axes of the diesel particulate filtering device 131 and the selective catalyst reduction device 133 are both substantially disposed to extend substantially parallel to each other in the vehicle width direction. The linear section 132*b* in the connecting pipe 132 also has a substantially cylindrical shape and the center axis thereof extends in the vehicle width direction. Specifically, the center axis of the linear section 132*b* of the connecting pipe 132 is disposed substantially parallel to the center axes of the diesel particulate filtering device 131 and the selective catalyst reduction device 133.

The cooling compartment 3 is disposed to the rear of the engine compartment 2 as illustrated in FIG. 2. The engine compartment 2 and the cooling compartment 3 are partitioned by a partition wall 9. The partition wall 9 has a communication hole 91. The communication hole 91 allows communication between the engine compartment 2 and the cooling compartment 3.

The cooling compartment 3 is defined by the vehicle body cover 8 in the same way as the engine compartment 2. Specifically, the upper surface of the cooling compartment 3 is defined by the top plate 81 and the sides of the cooling compartment 3 are defined by the first and second side plates 82 and 83.

Specifically, a front part of the top plate 81 defines the upper surface of the engine compartment 2, and a rear part of the top plate 81 defines the upper surface of the cooling compartment 3. The front parts of the first and second side plates 82 and 83 define the side surfaces of the engine compartment 2, and the rear parts of the first and second side plates 82 and 83 define the side surfaces of the cooling compartment 3.

A radiator 32 and a cooling fan 31 are contained inside the cooling compartment 3. The radiator 32 cools cooling liquid for the engine 11. The cooling fan 31 rotates to exhaust air from inside the cooling compartment 3 to the outside of the cooling compartment 3. Specifically, the cooling fan 31 rotates to exhaust air from inside the cooling compartment 3 to the outside of the cooling compartment 3 via a grille 33. That is, the cooling fan 31 generates an air flow toward the rear. In this case, the front of the cooling fan 31 is the air intake side of the cooling fan 31. The cooling fan 31 is disposed to the rear of the radiator 32. The grille 33 defines the rear surface of the cooling compartment 3.

Figure 4:
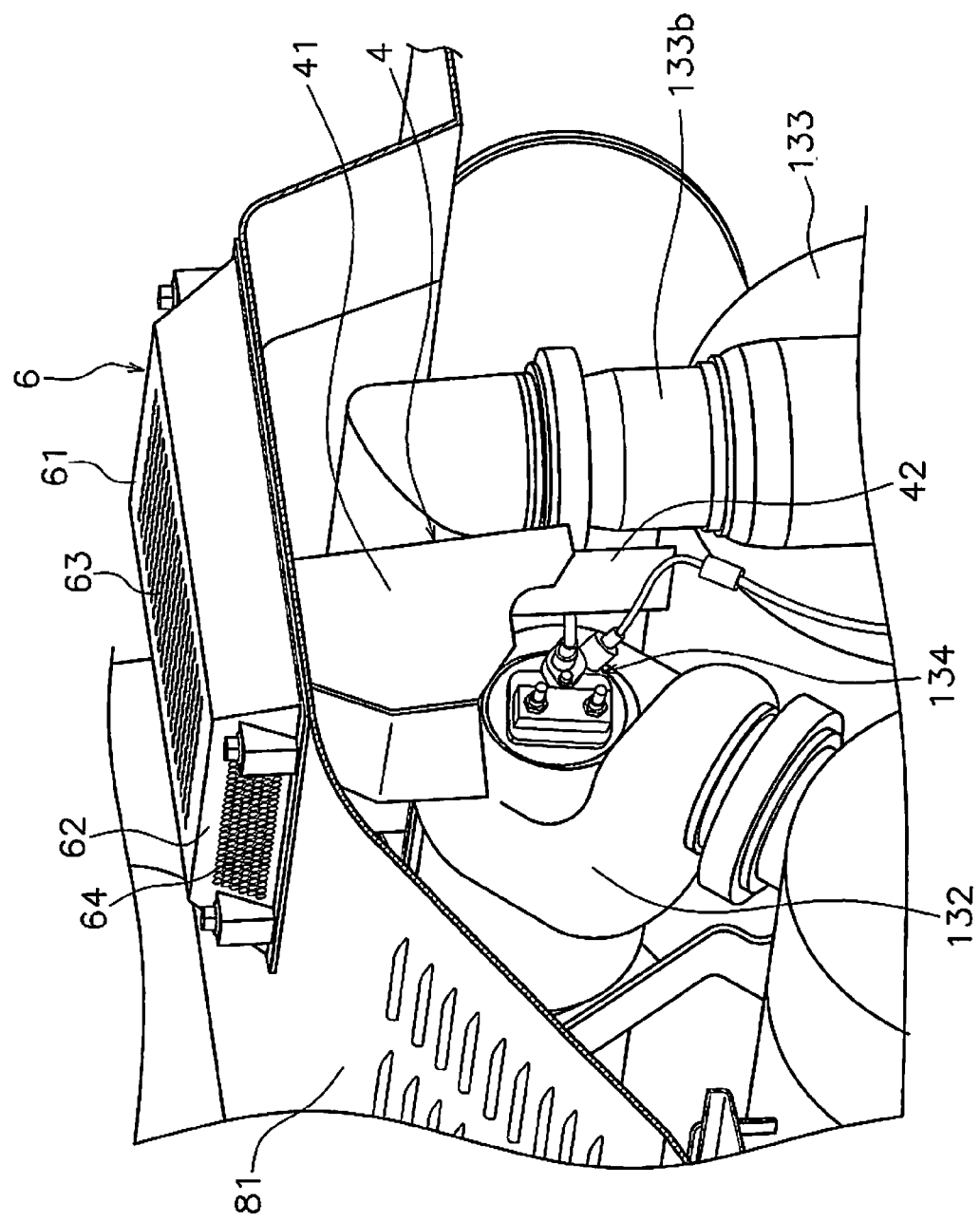
FIG. 4 is a cross-sectional view of the vicinity of the injection device.
Figure 5:
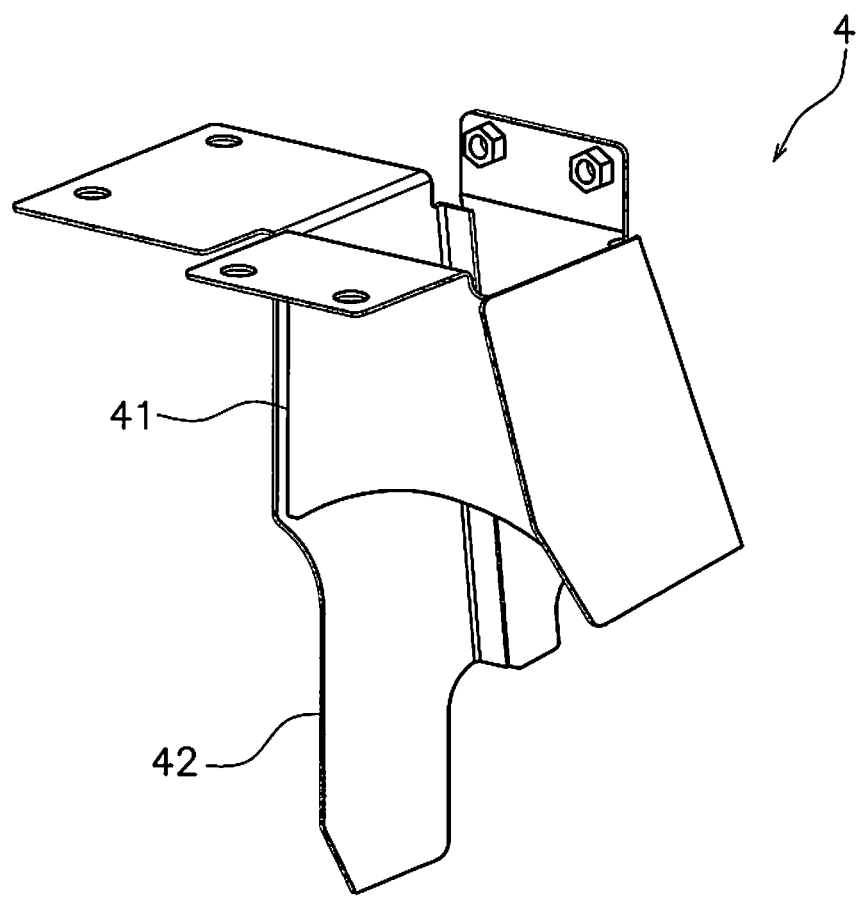
FIG. 5 is a perspective view of a duct member.

FIG. 4 is a cross-sectional view of the vicinity of the injection device 134 as seen from the right rear, and FIG. 5 is a perspective view of the duct member as seen from the left rear. As illustrated in FIG. 4, the wheel loader 100 is further provided with a duct member 4.

The duct member 4 is disposed above the injection device 134. The duct member 4 extends in the vertical direction. The duct member 4 is coated or plated with a coating having a lower emissivity than the duct member 4. For example, the duct member 4 is coated or plated with a heat-resistant silver colored coating. Specifically, the outside surface of the duct member 4 is coated or plated with the above coating. The duct member 4 may be formed by aluminum or an aluminum alloy. In this case, the coating with the low emissivity may not be applied by coating or plating.

As illustrated in FIG. 5, the duct member 4 has a duct body section 41 and a heat-shielding section 42. The duct body section 41 is a portion having a duct shape. A flow passage area of the duct body section 41 is larger in a lower end section than an upper end section thereof. Specifically, the flow passage area of the duct body section 41 increases in a downward direction in at least a portion of the duct body section 41. The flow passage inside the duct body section 41 has a rectangular shape as seen in a plan view.

The heat-shielding section 42 extends downward from the duct body section 41. As illustrated in FIG. 4, the heat-shielding section 42 is disposed between the injection device 134 and the selective catalyst reduction device 133. Specifically, the heat-shielding section 42 is disposed between the injection device 134 and the exhaust gas lead-out port 133*b* of the selective catalyst reduction device 133. Radiant heat radiating from the exhaust gas lead-out port 133*b* toward the injection device 134 is blocked by the heat-shielding section 42.

The duct member 4 does not cover the rear of the injection device 134. As a result, hot air around the injection device 134 flows smoothly to the rear when the belowmentioned cooling fan 31 is operating.

Figure 6:
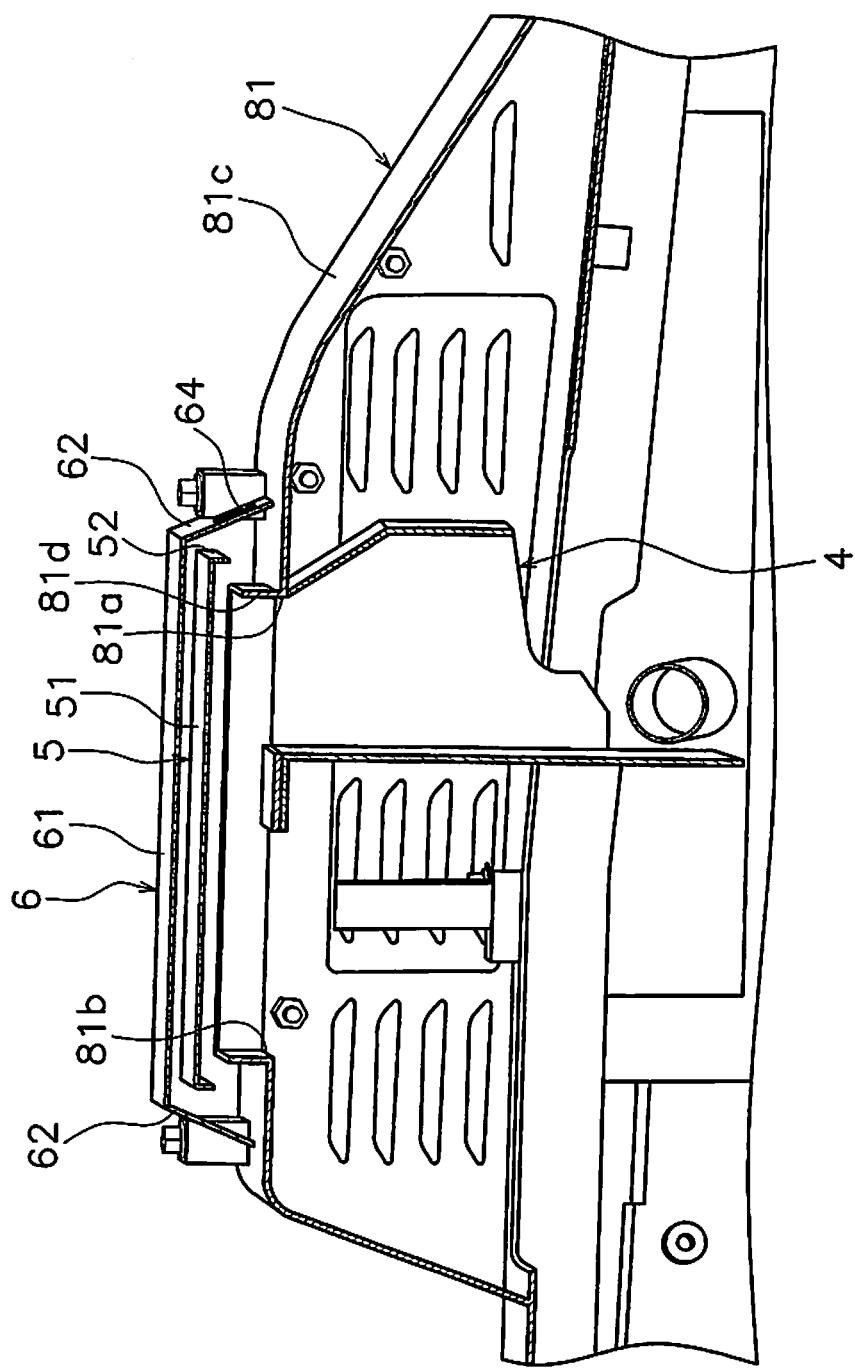
FIG. 6 is a cross-sectional view of the vicinity of the injection device.

FIG. 6 is a cross-sectional view illustrating members disposed above the injection device 134. As illustrated in FIG. 6, the top plate 81 has a first opening section 81a. The top plate 81 further has a second opening section 81b disposed in the proximity of the first opening section 81a. The first opening section 81a is positioned above the injection device 134. The duct member 4 extends between the first opening section 81a and the injection device 134. That is, the first opening section 81a, the duct member 4, and the injection device 134 overlap each other as seen in a plan view.

The top plate 81 has a top plate body section 81c and a second folded section 81d. The top plate body section 81c is a portion that defines the upper surface of the engine compartment 2. The first opening section 81a and the second opening section 81b are formed in the top plate body section 81c.

The second folded section 81d extends upward from the top plate body section 81c around the first opening section 81a. That is, the second folded section 81d is disposed to surround the first opening section 81a. The second folded section 81d is disposed to surround the second opening section 81b as well as the first opening section 81a. The height of the second folded section 81d, while not limited in particular is, for example, 10 mm or more to 30 mm or less. The intrusion of rainwater can be substantially prevented by making the height of the second folded section 81d 10 mm or greater. The height of the rear vehicle section 120b is suppressed and visibility to the rear can be maintained by making the height of the second folded section 81d approximately 30 mm or less.

The duct member 4 is disposed below the first opening section 81a of the top plate 81. Specifically, the duct member 4 is fixed to the top plate 81. For example, the duct member 4 is fixed to the top plate 81 with fastening members, such as bolts or by welding. The flow passage inside the duct member 4 and the first opening section 81a are in communication with each other. The duct member 4 and the top plate 81 may have a gap provided therebetween in the vertical direction.

The wheel loader 100 further includes a first cover member 5 and a second cover member 6. For example, the second cover member 6 is attached to the top plate 81. The first cover member 5 is attached to the second cover member 6 to hang down from the second cover member 6. That is, the top plate 81, the first cover member 5, and the second cover member 6 are disposed in order from the bottom.

The first cover member 5 is disposed above the first opening section 81a to cover the first opening section 81a. Specifically, the first cover member 5 is disposed above the top plate 81 with a gap provided between the top plate 81 and the first cover member 5. The first cover member 5 covers the second opening section 81b in addition to the first opening section 81a.

The first cover member 5 has a cover body section 51 and a first folded section 52. The cover body section 51 covers the first opening section 81a. Specifically, the cover body section 51 is disposed to cover the first opening section 81a as seen in a plan view. The cover body section 51 is disposed to cover the second opening section 81b in addition to the first opening section 81a as seen in a plan view.

The first folded section 52 extends downward from the outer edge part of the cover body section 51. The cover body section 51 and the first folded section 52 are preferably formed with one member. The first folded section 52 is formed along the entire circumference of the outer edge part of the cover body section 51. The first folded section 52 preferably is positioned on the outside of the second folded section 81d as seen in a plan view. While not limited in particular, the height of the first folded section 52 is, for example, approximately 2 mm or more to 15 mm or less.

The second cover member 6 is disposed above the first cover member 5. Specifically, the second cover member 6 is attached to the top plate 81. The first cover member 5 is disposed inside a space defined by the second cover member 6 and the top plate 81. The second cover member 6 has an upper plate part 61 and a side plate part 62.

The upper plate part 61 is disposed above the first cover member 5. As illustrated in FIG. 4, the upper plate part 61 has a first ventilation section 63. The first ventilation section 63 is configured by a plurality of through-holes. While not limited in particular, the size of the through-holes is preferably a size that does not allow the intrusion of foreign matter, such as dead leaves and the like, into the second cover member 6 via the first ventilation section 63. The first ventilation section 63 may be a mesh having a suitably loose weave.

The side plate part 62 extends from the outer edge part of the upper plate part 61 toward the top plate 81. Specifically, the side plate part 62 extends from the entire circumference of the outer edge part of the upper plate part 61 toward the top plate 81. For example, lower end sections of the side plate part 62 are fixed to the top plate 81 with fastening members, such as bolts or by welding.

The side plate part 62 has a second ventilation section 64. The second ventilation section 64 is configured by a plurality of through-holes. While not limited in particular, the size of the through-holes that configure the second ventilation section 64 may be approximately the same as the size of the through-holes that configure the first ventilation section 63.

As illustrated in FIG. 6, the lower end of the second ventilation section 64 is positioned lower than the upper end of the second folded section 81d. As a result, water that intrudes into the second cover member 6 is discharged from the second ventilation section 64 to the outside of the second cover member 6 before crossing the second folded section 81d. The upper plate part 61 and the side plate part 62 are preferably formed from one member.

The wheel loader 100 configured as described above operates as explained below. First, when the cooling fan 31 is stopped, hot air in the vicinity of the injection device 134 is sent upwards through the duct member 4 due to a chimney effect. The hot air sent upwards through the duct member 4 is exhausted to the outside of the engine compartment 2 through the first opening section 81a of the top plate 81.

The hot air exhausted from the first opening section 81a flows up above the first cover member 5 from the gap between the top plate 81 and the first cover member 5. The hot air that flows up above the first cover member 5 is exhausted to the outside of the second cover member 6 from the first ventilation section 63 of the second cover member 6. The hot air that flows out from the gap between the top plate 81 and the first cover member 5 is exhausted to the outside of the second cover member 6 through the second ventilation section 64 in addition to the first ventilation section 63. As a result, the exposure to hot air for the injection device 134 disposed inside the engine compartment 2 can be suppressed.

When the cooling fan 31 is rotating, air inside the engine compartment 2 is exhausted to the cooling compartment 3 through the communication hole 91 of the partition wall 9. As a result, air from outside flows into the engine compartment 2 through the first opening section 81a. The duct member 4 guides the air from the first opening section 81a to the injection device 134 and thus the injection device 134 is efficiently cooled.

When the duct member 4 is not present, hot air from the exhaust gas post-processing device 13 disposed around the injection device 134 would fill the area in the vicinity of the first opening section 81a and there is a concern that it would be difficult to exhaust the hot air around the injection device 134 from the first opening section 81a to the outside of the engine compartment 2. Accordingly in the present embodiment, the duct member 4 is able to preferentially exhaust the hot air in the vicinity of the injection device 134 from the first opening section 81a because the duct member 4 is disposed between the injection device 134 and the first opening section 81a.

When the duct member 4 is not present, there is a concern that it would be difficult to exhaust the abovementioned hot air around the injection device 134 from the first opening section 81a. Therefore, when the duct member 4 is not present, the first opening section 81a would need to be made sufficiently large to sufficiently exhaust the hot air around the injection device 134 from the first opening section 81a. Accordingly in the present embodiment, the duct member 4 preferentially exhausts the hot air around the injection device 134 and thus there is no need to increase the size of the first opening section 81a. As a result, noise leaking to the outside from the engine compartment 2 can be suppressed and the intrusion of water and foreign matter into the engine compartment 2 through the first opening section 81a can be suppressed.

While an exemplary embodiment of the present invention has been described above, the present invention is not limited to the exemplary embodiment and the following modifications may be made within the scope of the present invention.

While the top plate 81 has the second opening section 81b in addition to the first opening section 81a in the above exemplary embodiment, the configuration of the top plate 81 is not limited in this way. For example, the top plate 81 may not have the second opening section 81b.

While the flow passage of the duct member 4 has a rectangular shape as seen in a plan view in the above exemplary embodiment, the shape of the flow passage of the duct member 4 is not limited in this way. For example, the flow passage of the duct member 4 may have a circular shape as seen in a plan view. That is, the duct member 4 may have a cylindrical shape.

While the injection device 134 has been exemplified in the above embodiment as the member to be cooled, the member to be cooled is not limited to the injection device 134. For example, the member to be cooled may be a sensor or an electronic component.

While the wheel loader 100 to which the present invention is applied has been described in the above exemplary embodiment, the present invention may be applicable to another work vehicle such as a motor grader.

What is claimed is:

1. A work vehicle comprising:
    an engine;
    an engine compartment containing the engine;
    a cooling fan;
    a cooling compartment communicating with the engine compartment and containing the cooling fan;
    a top plate having a first opening section and defining an upper surface of the engine compartment;
    a member to be cooled disposed inside the engine compartment; and
    a duct member disposed above the member to be cooled and disposed below the first opening section,
    when the cooling fan is stopped, hot air is exhausted to an outside of the engine compartment through the duct member, and
    when the cooling fan is rotating, air from the outside flows into the engine compartment through the duct member.

2. The work vehicle according to claim 1, further comprising
    a first cover member disposed above the first opening section to cover the first opening section.

3. The work vehicle according to claim 2, wherein
    the first cover member has a cover body section covering the first opening section and a first folded section extending downward from the outer edge part of the cover body section.

4. The work vehicle according to claim 2, further comprising
    a second cover member having a first ventilation section configured by a plurality of through-holes and disposed above the first cover member.

5. The work vehicle according to claim 4, wherein
    the second cover member has an upper plate part disposed above the first cover member and a side plate part extending toward the top plate from the outer edge part of the upper plate part; and
    the upper plate part has the first ventilation section.

6. The work vehicle according to claim 5, wherein
    the second cover member has a second ventilation section configured with a plurality of through-holes formed in the side plate part.

7. The work vehicle according to claim 6, wherein
    the top plate has a top plate body section, and a second folded section that extends upwards from the top plate body section to surround the first opening section; and
    a lower end of the second ventilation section is positioned lower than an upper end of the second folded section.

8. The work vehicle according to claim 4, wherein
    the second cover member is attached to the top plate, and the first cover member is attached to the second cover member.

9. The work vehicle according to claim 1, wherein
    the top plate has a top plate body section, and a second folded section that extends upwards from the top plate body section to surround the first opening section.

10. The work vehicle according to claim 1, wherein
    the top plate further has a second opening section disposed in the proximity of the first opening section.

11. The work vehicle according to claim 1, further comprising
    a selective catalyst reduction device configured to treat exhaust gas from the engine; and
    a connecting pipe connected to the selective catalyst reduction device;
    wherein the member to be cooled is an injection device configured to inject a reducing agent into the connecting pipe.

12. The work vehicle according to claim 1, wherein
    the lower end section of the duct member has a flow passage area that is larger than that of the upper end section.

13. The work vehicle according to claim 1, wherein the upper end section of the duct member is attached to the top plate.

14. The work vehicle according to claim 1, wherein the duct member is coated or plated with a coating having a lower emissivity than the duct member.

15. The work vehicle according to claim 1, wherein the duct member is formed with aluminum or an aluminum alloy.

16. The work vehicle according to claim 1, wherein the duct member has a heat-shielding section disposed between the member to be cooled and a heat source.

17. The work vehicle according to claim 1, further comprising
a partition wall that separates the engine compartment and the cooling compartment; and
a communication section that allows communication between the engine compartment and the cooling compartment.

18. The work vehicle according to claim 17, wherein the communication section is a communication hole formed in the partition wall.

19. A work vehicle comprising:
an engine;
an engine compartment containing the engine;
a top plate having a first opening section and defining an upper surface of the engine compartment;
a member to be cooled disposed inside the engine compartment;
a tubular member disposed above the member to be cooled and disposed below the first opening section;
a second cover member disposed above the tubular member,
the second cover member having an upper plate part, a side plate part extending toward the top plate from the outer edge part of the upper plate part, and a second ventilation section configured with a plurality of through-holes formed in the side plate part,
the top plate having a top plate body section, and a second folded section that extends upwards from the top plate body section to surround the first opening section, and
a lower end of the second ventilation section being positioned lower than an upper end of the second folded section.

20. A work vehicle comprising:
an engine;
an engine compartment containing the engine;
a cooling fan;
a cooling compartment communicating with the engine compartment and containing the cooling fan;
a top plate having a first opening section and defining an upper surface of the engine compartment;
a selective catalyst reduction device configured to treat exhaust gas from the engine;
a connecting pipe connected to the selective catalyst reduction device;
an injection device disposed inside the engine compartment and configured to inject a reducing agent into the connecting pipe;
a member to be cooled disposed inside the engine compartment; and
a duct member disposed above the member to be cooled and disposed below the first opening section,
when the cooling fan is stopped, hot air is exhausted to an outside of the engine compartment through the tubular member, and
when the cooling fan is rotating, air from the outside flows into the engine compartment through the duct member.

* * * * *